United States Patent [19]

Fujino

[11] Patent Number: 5,581,524

[45] Date of Patent: Dec. 3, 1996

[54] MAGNETOOPTICAL INFORMATION RECORDING AND/OR REPRODUCING METHOD AND APPARATUS IN WHICH PRIOR TO ACTUAL RECORDING AND/OR REPRODUCING, INFORMATION IS RECORDED ON A RECORDING MEDIUM TO SET REFERENCE CONDITIONS FOR ACTUAL RECORDING AND/OR REPRODUCING

[75] Inventor: Masahisa Fujino, Musashino, Japan

[73] Assignee: Canon Kabushiki Kaisha, Tokyo, Japan

[21] Appl. No.: 36,884

[22] Filed: Mar. 25, 1993

[30] Foreign Application Priority Data

Mar. 31, 1992 [JP] Japan ..................................... 4-104043
Mar. 31, 1992 [JP] Japan ..................................... 4-104044

[51] Int. Cl.$^6$ .................................................. G11B 17/00
[52] U.S. Cl. ........................... 369/44.27; 369/13; 369/54
[58] Field of Search ................................ 360/114, 59, 66; 369/13, 44.22, 110, 44.27, 44.31, 44.32, 44.39, 58, 54

[56] References Cited

U.S. PATENT DOCUMENTS

| | | | |
|---|---|---|---|
| 4,868,802 | 9/1989 | Kobori ........................................ | 369/13 |
| 5,043,972 | 8/1991 | Kurihara et al. ......................... | 369/215 |
| 5,159,584 | 10/1992 | Yanagida et al. ......................... | 369/13 |
| 5,193,080 | 3/1993 | Mohri et al. ............................. | 369/244 |

FOREIGN PATENT DOCUMENTS

| | | |
|---|---|---|
| 0273250 | 7/1988 | European Pat. Off. . |
| 0464947 | 1/1992 | European Pat. Off. . |
| 0503095 | 9/1992 | European Pat. Off. . |
| 1089054 | 7/1989 | Japan . |
| 0173458 | 7/1989 | Japan ........................................ 369/13 |
| 0308459 | 12/1990 | Japan ........................................ 369/13 |
| 4085741 | 3/1992 | Japan ........................................ 369/13 |

OTHER PUBLICATIONS

Patent Abstracts of Japan, Kokai No. 01-089054, vol. 13, No. 322, Jul. 1989.
Patent Abstracts of Japan, Kokai No. 01-155504, vol. 13, No. 424, Sep. 1989.
Patent Abstracts of Japan, Kokai No. 02-021444, vol. 14, No. 165, Mar. 1990.
Patent Abstracts of Japan, Kokai No. 02-193346, vol. 14, No. 482, Oct. 1990.

*Primary Examiner*—Robert Pascal
*Assistant Examiner*—Arnold Kinkead
*Attorney, Agent, or Firm*—Fitzpatrick, Cella, Harper & Scinto

[57] ABSTRACT

Recording of information on and/or reproduction of information from a magnetooptical recording medium is effected as follows. A light beam from an objective lens is irradiated on a track of the recording medium. The objective lens is driven in a direction perpendicular to the track such that the beam spot and the track have a predetermined positional relationship therebetween. A magnetic field modulated according to information to be recorded is applied to the beam spot irradiated position of the recording medium by a magnetic field applying device. A relative position between the objective lens and the magnetic field applying device in the direction perpendicular to the track is detected. The recording of information is effected on the recording medium by applying the magnetic field according to the information while changing the beam spot irradiated position on the recording medium with respect to the track. The movable range of the objective lens, in which a level of a reproduction signal obtained in the reproduction of information exceeds a predetermined level, in the direction perpendicular to the track, in the recording operation, is detected on the basis of a detection result of the relative position, so that a driver for the objective lens is controlled on the basis of the detected movable range.

12 Claims, 6 Drawing Sheets

MAGNETOOPTICAL INFORMATION RECORDING AND/OR REPRODUCING METHOD AND APPARATUS IN WHICH PRIOR TO ACTUAL RECORDING AND/OR REPRODUCING, INFORMATION IS RECORDED ON A RECORDING MEDIUM TO SET REFERENCE CONDITIONS FOR ACTUAL RECORDING AND/OR REPRODUCING

BACKGROUND OF THE INVENTION

1. Field of the Invention

The present invention relates to a magnetooptical information recording/reproducing apparatus and method, which can erase and rewrite information on a disk-shaped magnetooptical recording medium and, more particularly, to a magnetooptical information recording/reproducing apparatus and method corresponding to a magnetic field modulation type overwrite-capable magnetooptical recording medium.

2. Related Background Art

Conventionally, the performance of a magnetooptical recording method based on a magnetic field modulation method has been sufficiently improved so as to achieve short recording, reproduction, and erase times, a large capacity, and high-speed access. Such a magnetooptical information recording/reproducing apparatus has a construction, as shown in, e.g., FIG. 1. More specifically, seek operations of both an optical head (optical pickup device) 103 and a magnetic head 108 are simultaneously performed by a seek motor. The seek motor is constituted by a linear motor coil 104 provided on the optical head 103, and a magnetic circuit arranged along a guide 107 for guiding the optical head 103 and including a magnet 106 and a yoke 105. The magnetic head 108, which opposes the optical head 103 to sandwich a recording medium therebetween, is mounted on a floating slider. The slider is mounted on a coupling member 110 via a support beam (suspension) 109, and the coupling member 110 is fixed to the optical head 103.

Figure 1:
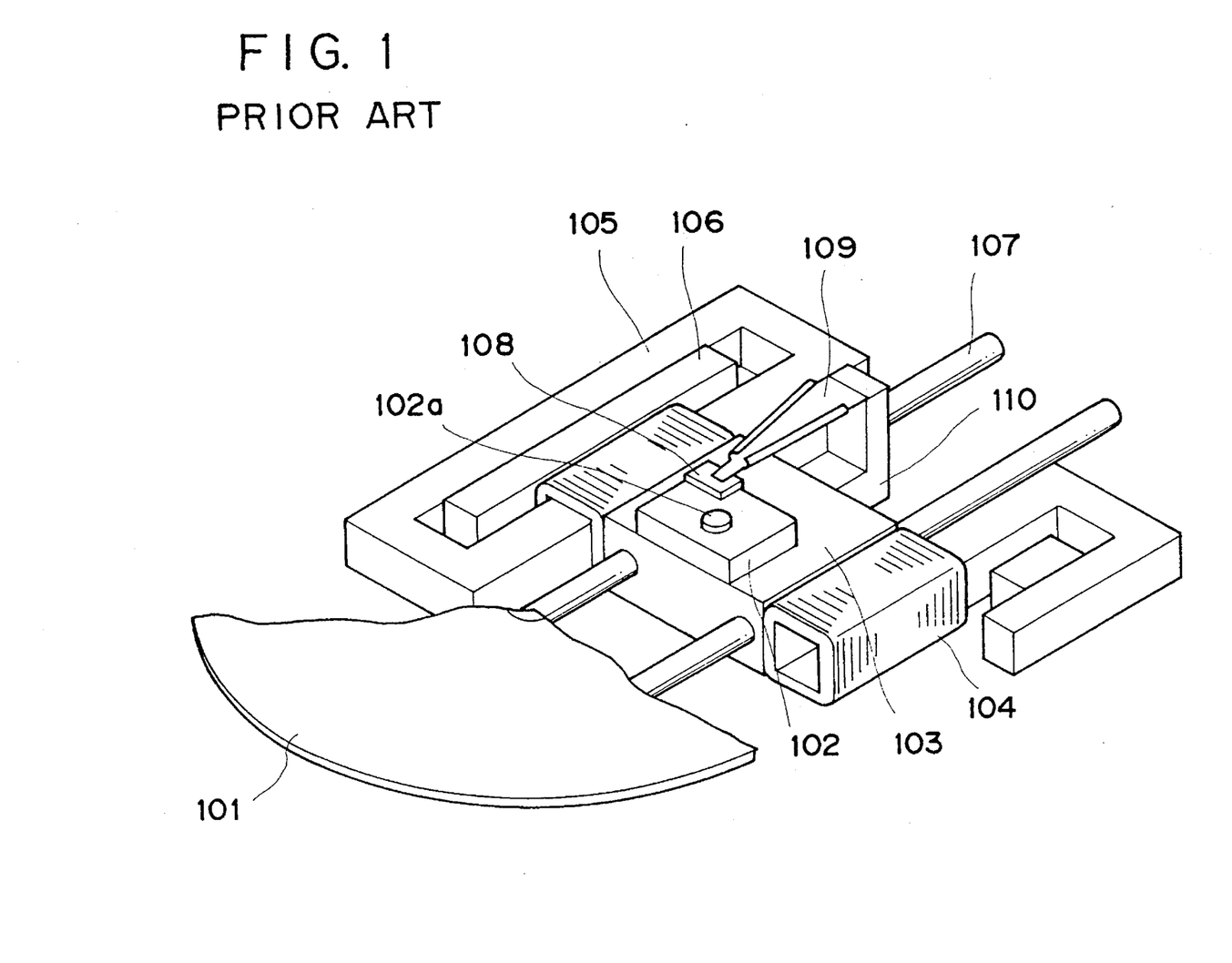
FIG. 1 is a perspective view showing a conventional magnetooptical information recording/reproducing apparatus.

The optical head 103 comprises an actuator 102 for two-dimensionally driving its objective lens 102a, and can finely adjust the tracking and focusing directions of the objective lens 102a. A seek operation in the radial direction of a magnetooptical recording medium 101 is attained by current control for the linear motor coil 104, as described above, and tracking and focusing operations in recording and reproduction modes are attained by current control for a corresponding coil of the actuator 102. In this case, the tracking control of the objective lens 102a by the actuator 102 is limited to a movable range of the objective lens 102a. When a tracking error is large, and exceeds the movable range, tracking control of the optical head 103 itself is performed using the above-mentioned seek motor.

However, in the above-mentioned construction, the relative position between the optical head 103 and the magnetic head 108 must be adjusted with high precision since it influences data reproducibility of magnetooptical recording media compatible to a magnetooptical disk apparatus. Thus, the apparatus must be assembled with strict care. However, since the magnetic head 108 is mechanically coupled to the optical head side via the support beam (suspension) 109, it is difficult to adjust the apparatus with required precision, and such adjustment requires considerable time. When the apparatus is used, a change in volume of the mechanical coupling portion occurs due to a change in temperature in the apparatus, and this may shift the relative position between the optical head 103 and the magnetic head 108. In this manner, when the relative position adjustment precision is lowered, recording may be performed to disturb data reproducibility even within the fine adjustment movable range of the objective lens 102a by the actuator 102.

SUMMARY OF THE INVENTION

The present invention has been made in consideration of the above situation, and has as its object to provide a magnetooptical information recording/reproducing apparatus and method, which can prevent recording, which may disturb data reproducibility, even when relative position adjustment between a magnetic head and an optical head is insufficient upon assembling of the apparatus and/or when the relative position adjustment precision is lowered due to, e.g., a change in temperature in the apparatus.

In order to achieve the above object, there is provided a magnetooptical information recording/reproducing apparatus for recording/reproducing information on/from a magnetooptical recording medium having a plurality of tracks, comprising:

an objective lens for irradiating a track of the recording medium with a beam spot;

drive means for driving the objective lens in a direction perpendicular to the track, so that the beam spot and the track have a predetermined positional relationship therebetween;

magnetic field applying means for applying a magnetic field modulated according to information to a beam spot irradiated position of the recording medium;

reproduction means for reproducing information recorded on the recording medium; and detection means for detecting a relative position between the objective lens and the magnetic field applying means in the direction perpendicular to the track, wherein information is recorded on the recording medium by applying the magnetic field according to the information by the magnetic field applying means while the beam spot irradiated position on the recording medium with respect to the track is changed by the drive means, the recorded information is reproduced by the reproduction means, a movable range in which a level of a reproduction signal obtained at that time exceeds a predetermined level, in the direction perpendicular to the track, of the objective lens in the recording operation is detected on the basis of a detection result of the detection means, and the drive means is controlled on the basis of the detected movable range.

There is also provided a magnetooptical information recording/reproducing method for recording/reproducing information on/from a magnetooptical recording medium having a plurality of tracks, comprising:

the step of irradiating a track of the recording medium with a beam spot;

the step of executing tracking control of the beam spot with respect to the track;

the step of recording information by applying a magnetic field modulated according to information onto the beam spot irradiated position by magnetic field applying means while changing the beam spot position on the recording medium with respect to the track;

the step of reproducing the information recorded on the recording medium, and detecting a reproduction signal;

the step of detecting a relative position between the beam spot and the magnetic field applying means; and the step of detecting a movable range in which a level of a reproduction signal detected in the reproduction signal detection step exceeds a predetermined level, of the beam spot with respect to the track in the recording step on the basis of a detection result of the relative position detection step, wherein the tracking control step is executed on the basis of the detected movable range.

There is also provided a magnetooptical information recording/reproducing apparatus for recording/reproducing information on/from a magnetooptical recording medium having a plurality of tracks, comprising:

an objective lens for irradiating a track of the recording medium with a beam spot;

drive means for driving the objective lens with respect to a reference position in a direction perpendicular to the track, so that the beam spot and the track have a predetermined positional relationship therebetween;

magnetic field applying means for applying a magnetic field modulated according to information to a beam spot irradiated position of the recording medium;

reproduction means for reproducing information recorded on the recording medium; and detection means for detecting a relative position between the objective lens and the magnetic field applying means in the direction perpendicular to the track, wherein information is recorded on the recording medium by applying the magnetic field according to the information by the magnetic field applying means while the beam spot irradiated position on the recording medium with respect to the track is changed by the drive means, the recorded information is reproduced by the reproduction means, a movable range in which a level of a reproduction signal obtained at that time exceeds a predetermined level, in the direction perpendicular to the track, of the objective lens in the recording operation is detected on the basis of a detection result of the detection means, a difference between a central position of the detected movable range and the reference position of the objective lens is calculated, and the drive means performs the driving operation in consideration of the difference.

There is also provided a magnetooptical information recording/reproducing method for recording/reproducing information on/from a magnetooptical recording medium having a plurality of tracks, comprising:

the step of irradiating a track of the recording medium with a beam spot;

the step of executing tracking control for moving the beam spot with respect to a reference position in a direction perpendicular to the track so as to cause the beam spot to trace the track;

the step of recording information by applying a magnetic field modulated according to information onto the beam spot irradiated position by magnetic field applying means while changing the beam spot irradiated position on the recording medium with respect to the track;

the step of reproducing the information recorded on the recording medium, and detecting a reproduction signal;

the step of detecting a relative position between the beam spot and the magnetic field applying means;

the step of detecting a movable range in which a level of a reproduction signal detected in the reproduction signal detection step exceeds a predetermined level, of the beam spot with respect to the track in the recording step on the basis of a detection result of the relative position detection step; and the step of calculating a central position of the movable range detected in the movable range detection step and a difference between the central position and the reference position, wherein the tracking control step includes the step of controlling tracking of the beam spot in consideration of the calculated difference.

DETAILED DESCRIPTION OF THE PREFERRED EMBODIMENTS

[First Embodiment]

Figure 2:
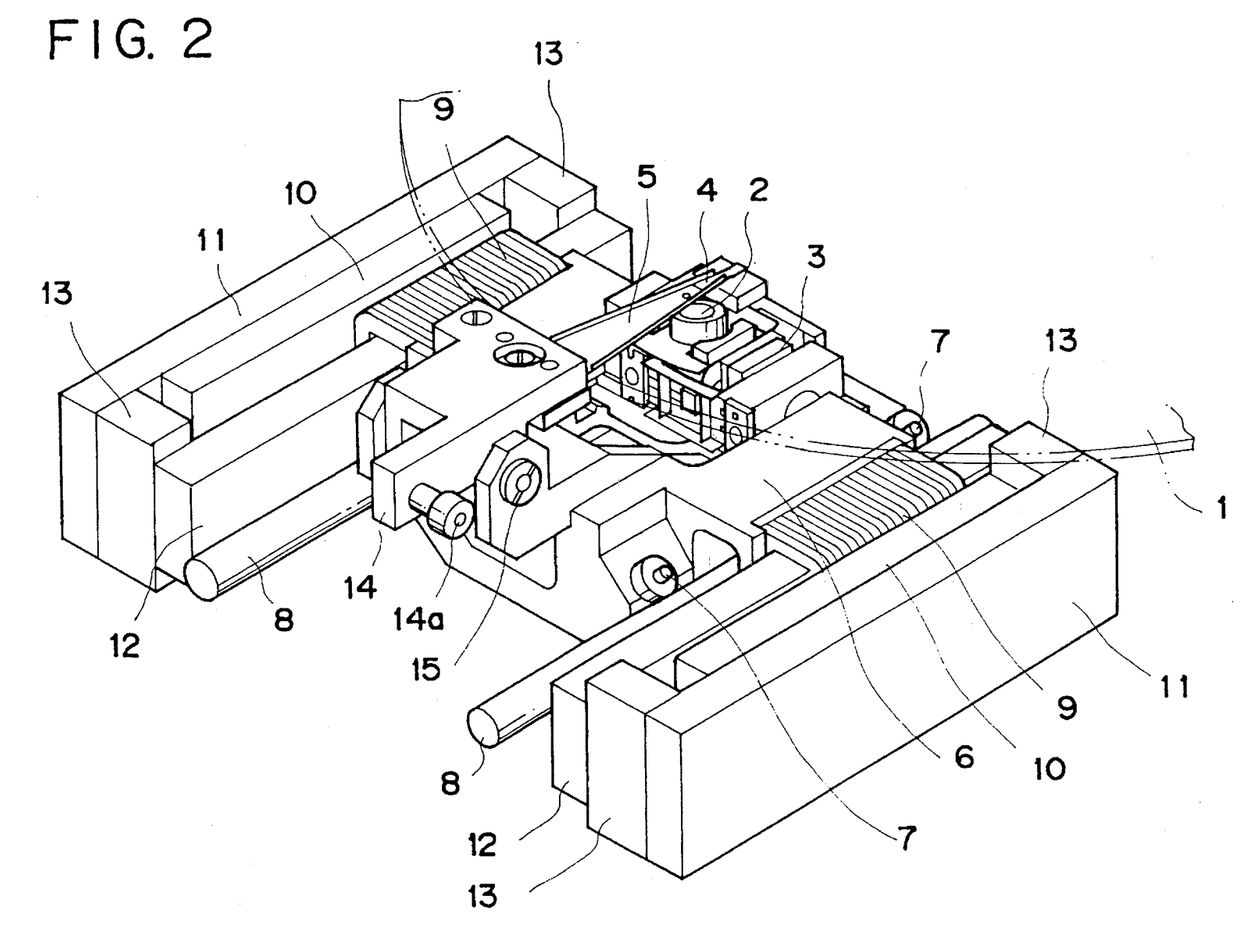
FIG. 2 is a perspective view showing a magnetooptical information recording/reproducing apparatus according to the first embodiment of the present invention.

The preferred embodiments of the present invention will be described in detail below with reference to the accompanying drawings. In a magnetooptical information recording/reproducing apparatus shown in FIG. 2, both an optical head (optical pickup device) 6 for irradiating a recording medium with a beam spot and a magnetic head (not shown) arranged on a floating slider 4 are mounted on a single carriage, and their seek operations are simultaneously performed by a seek motor. The seek motor is constituted by a linear motor coil 9 provided to the optical head 6, and a magnetic circuit arranged along a guide rail 8 for guiding the optical head 6 and including a magnet 10, a center yoke 12, a back yoke 11, and joint yokes 13 for coupling these yokes. The slider 4 is attached to a pivot member 14 of a magnetic head escaping mechanism via a support beam (suspension) 5. The pivot member 14 is supported on the optical head 6 to be pivotal about a support shaft 15. An escaping control roller 14a is attached to the rear end of the pivot member 14. A drive member (not shown) of the escaping mechanism, which member has a pressing surface extending in the seek direction, is arranged to oppose the control roller 14a from above so as to push the control roller 14a downward.

The optical head 6 has an objective lens 2 facing the magnetic head, and also has an actuator 3 for finely moving and adjusting the objective lens 2 in the tracking and focusing directions. As shown in detail in FIG. 3, in the actuator 3, opposing back yoke portions 26a are formed on the right and left portions of a yoke 26 also serving as a mounting substrate, and magnets 25 are mounted on the back yoke portions 26a. A lens holder 21, which holds the objective lens 2, is arranged between these magnets 25. Tracking coils 24 and focusing coils 23 are attached to the lens holder 21 to oppose the magnets 25. A spacer 27 is arranged at one side of the yoke 26 to be located on the back surface of one back yoke portion 26a. Leaf springs 22 extend from the spacer 27 in the back-and-forth direction of the lens holder 21 to movably support the lens holder 21 in the back-and-forth direction (tracking direction). For this reason, when the coils 24 are energized, the lens holder 21 is finely moved and adjusted in the tracking direction.

Figure 4:
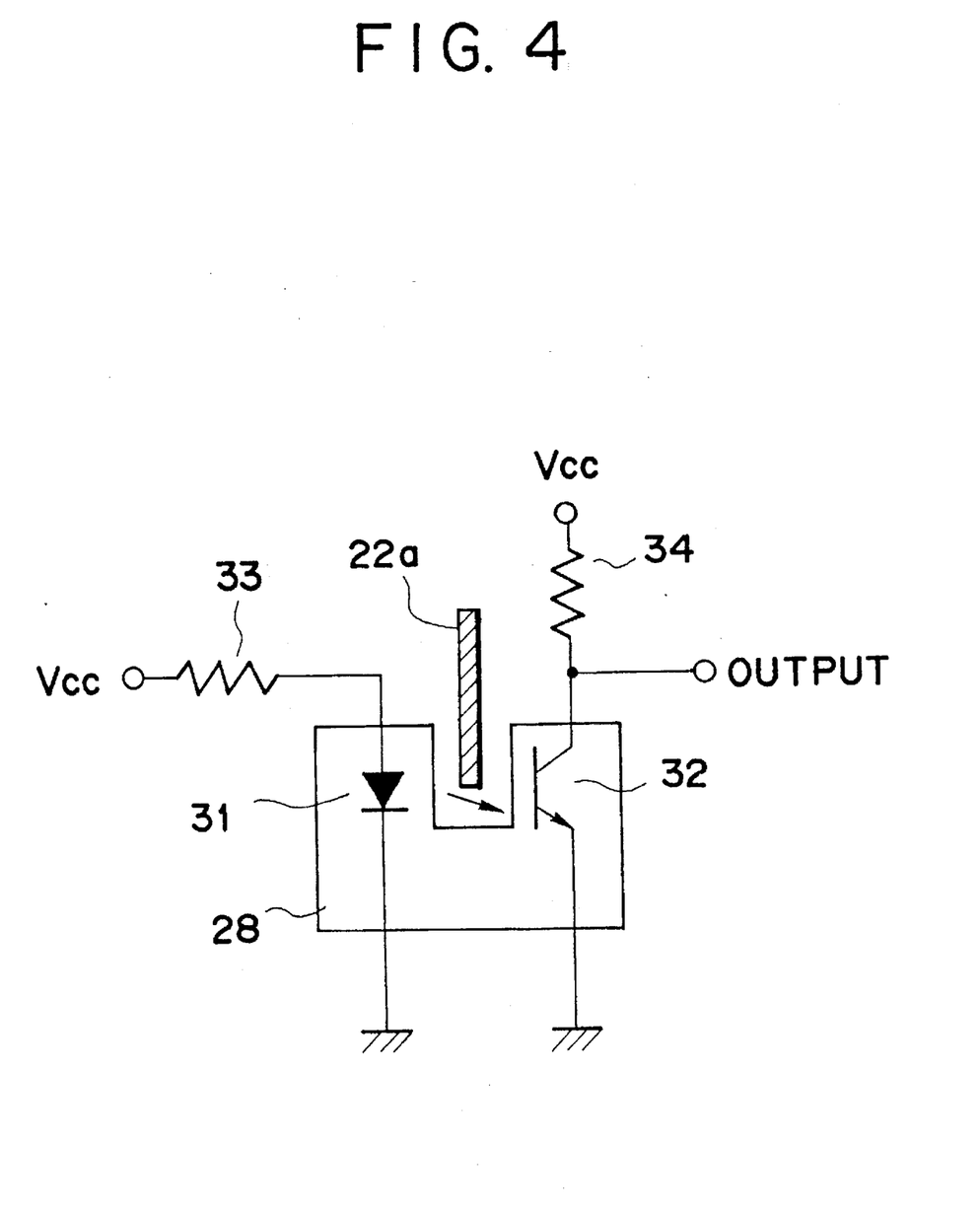
FIG. 4 is a circuit diagram of a position sensor in the device shown in FIG. 3.
Figure 5A:
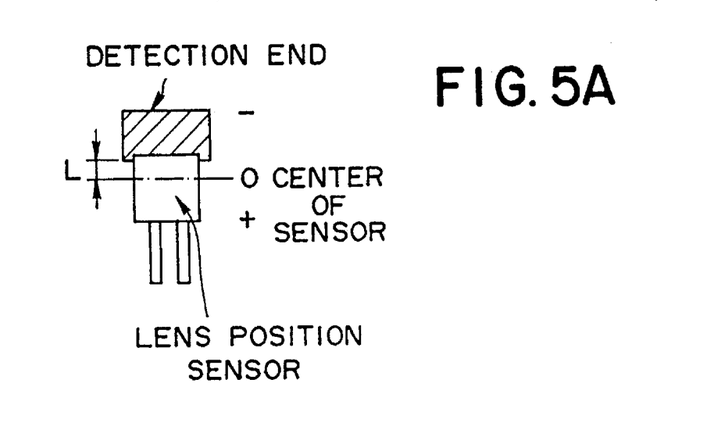
FIG. 5 is a graph showing the output characteristics of the circuit shown in FIG. 4.
Figure 5B:
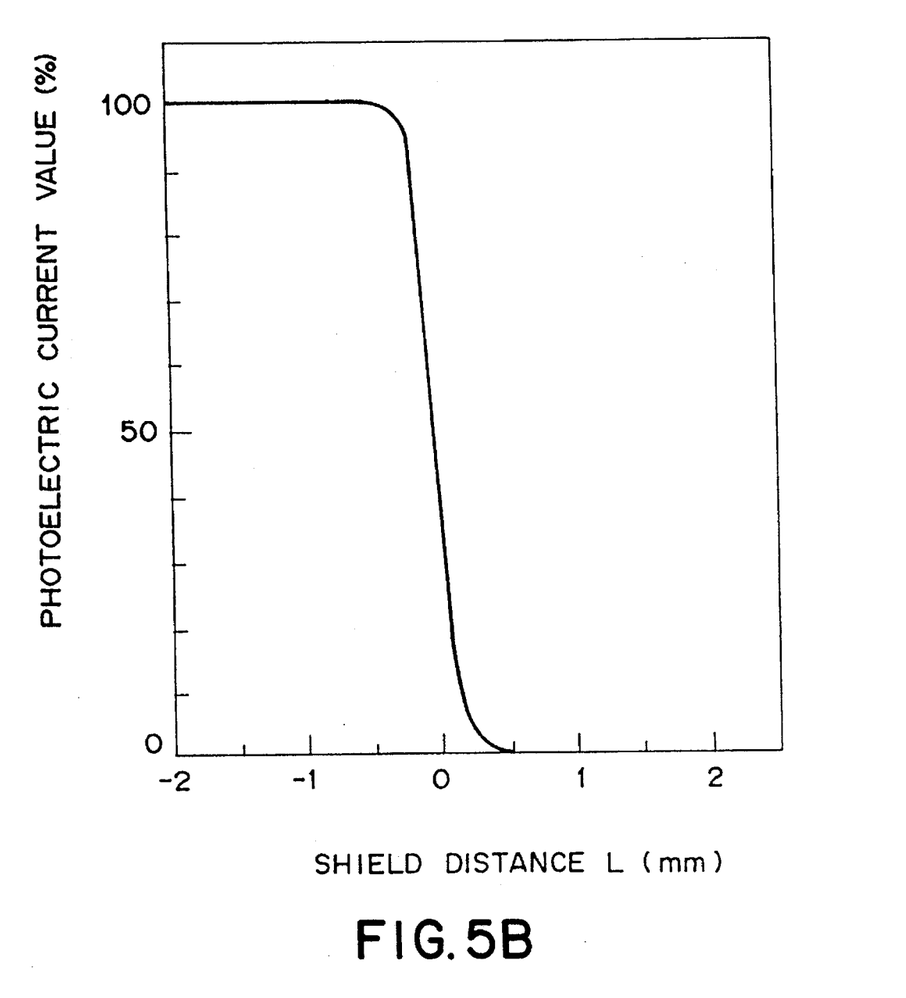
Figure 6:
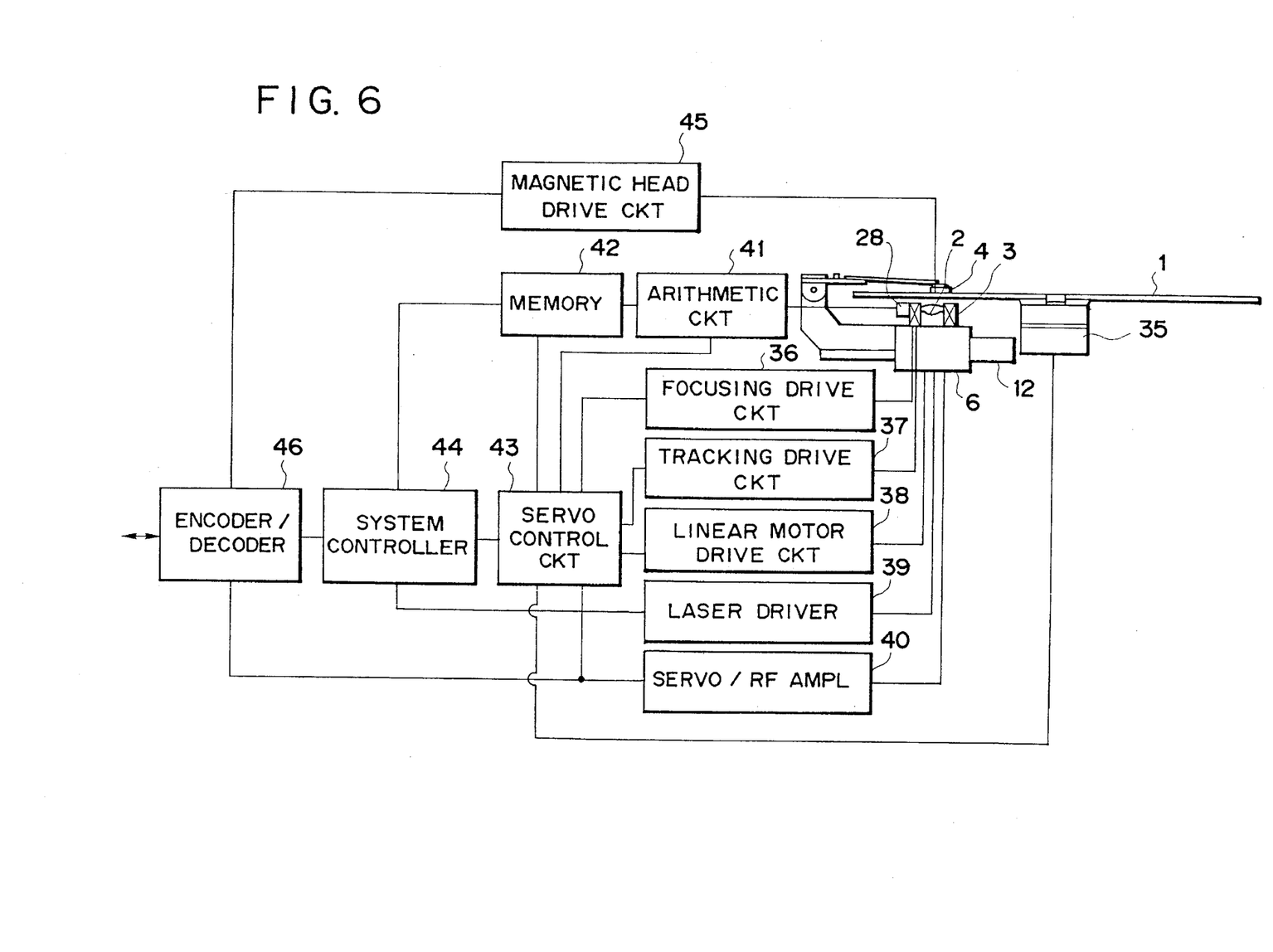
FIG. 6 is a block diagram showing a control system of the magnetooptical information recording/reproducing apparatus according to the present invention.

In this embodiment, a flat detection end member 22a is cut and stands upright from one leaf spring 22, and a lens position sensor 28 is attached to the yoke 26 via a bracket so as to sandwich the detection end member 22a from its right and left sides. As shown in FIG. 4, the lens position sensor 28 comprises an LED 31 and a phototransistor 32 which oppose each other to sandwich the detection end member 22a therebetween. The LED 31 and the phototransistor 32 are connected to a power supply $V_{cc}$ via resistors 33 and 34, respectively, and an output terminal (OUTPUT) of the sensor 28 is connected to an arithmetic circuit 41 (FIG. 6). Note that the phototransistor has characteristics shown in FIG. 5, and the ratio of the photoelectric current value when the end position of the detection end member 22a is separated by L mm from the center of the lens position sensor is specified. For this reason, when the objective lens 2 (in other words, the lens holder 21) is finely moved and adjusted in the tracking direction, since the photoelectric current value changes, the position of the objective lens 2 relative to the carriage in the tracking direction can be detected. This means that the relative position between the objective lens 2 and the magnetic head or the relative position between a beam spot and the magnetic head can be detected.

A control system of the magnetooptical information recording/reproducing apparatus has a construction, as shown in the schematic diagram of FIG. 6. In this arrangement, a system controller 44 serves as a central control unit. A magnetooptical recording medium 1 is rotated by driving a spindle motor 35 via a servo control circuit 43 in response to an instruction from the system controller 44, and a servo signal can be output to the coils 23 via a focusing drive circuit 36, to the coils 24 via a tracking drive circuit 37, and to the linear motor coil 9 via a linear motor drive circuit 38. On the other hand, as for an optical system, a laser driver 39 is driven in response to an instruction signal from the system controller 44. In the optical system, a servo signal and a data signal are extracted from light reflected by the magnetooptical recording medium 1 via a servo/RF amplifier 40. The servo signal is fed back to the servo control circuit 43 to attain tracking/focusing control of a beam spot, and the data signal is output to an encoder/decoder 46 as a reproduction signal or a verifying signal in a recording mode. The system controller 44 performs laser irradiation onto the recording surface of the magnetooptical recording medium using the optical system on the basis of data information input from an external apparatus via the encoder/decoder 46, and applies a modulated magnetic field to the magnetic head on the basis of the data signal supplied from the encoder/decoder 46 to a magnetic head drive circuit 45, thus realizing magnetooptical recording.

In particular, according to the present invention, a test signal is supplied from the control system to the encoder/decoder 46 to record the test signal prior to recording on the magnetooptical recording medium 1, and at the same time, a reproduction signal of the recorded test signal is detected by the servo/RF amplifier 40.

When the test signal is recorded, the system controller 44 performs recording while driving the objective lens 2 from one end to the other end of the movable range via the servo control circuit 43.

The servo control circuit 43 checks the amplitude level of the detected reproduction signal, and controls the arithmetic circuit 41 to calculate the movable range (a range capable of assuring an application magnetic field necessary for recording) in which information whose amplitude level exceeds a predetermined level is recorded, in the tracking direction, of the objective lens 2 in the recording mode, on the basis of the output from the position sensor 28, and to store the movable range in a memory (storage means) 42.

Upon execution of data recording, the servo control circuit 43 limits tracking control, so that the tracking control of the objective lens 2 is performed within the movable range stored in the memory 42.

When magnetooptical recording is performed on a magnetooptical recording medium 1 compatible to the magnetooptical information recording/reproducing apparatus in this manner, the tracking fine adjustment range of the objective lens 2 in the recording mode can be limited, and data reproducibility in a reproduction mode can be assured even when the relative position between the magnetic head and the optical head is aligned with poor precision in assembling and/or when a position error occurs in use.

Figure 3:
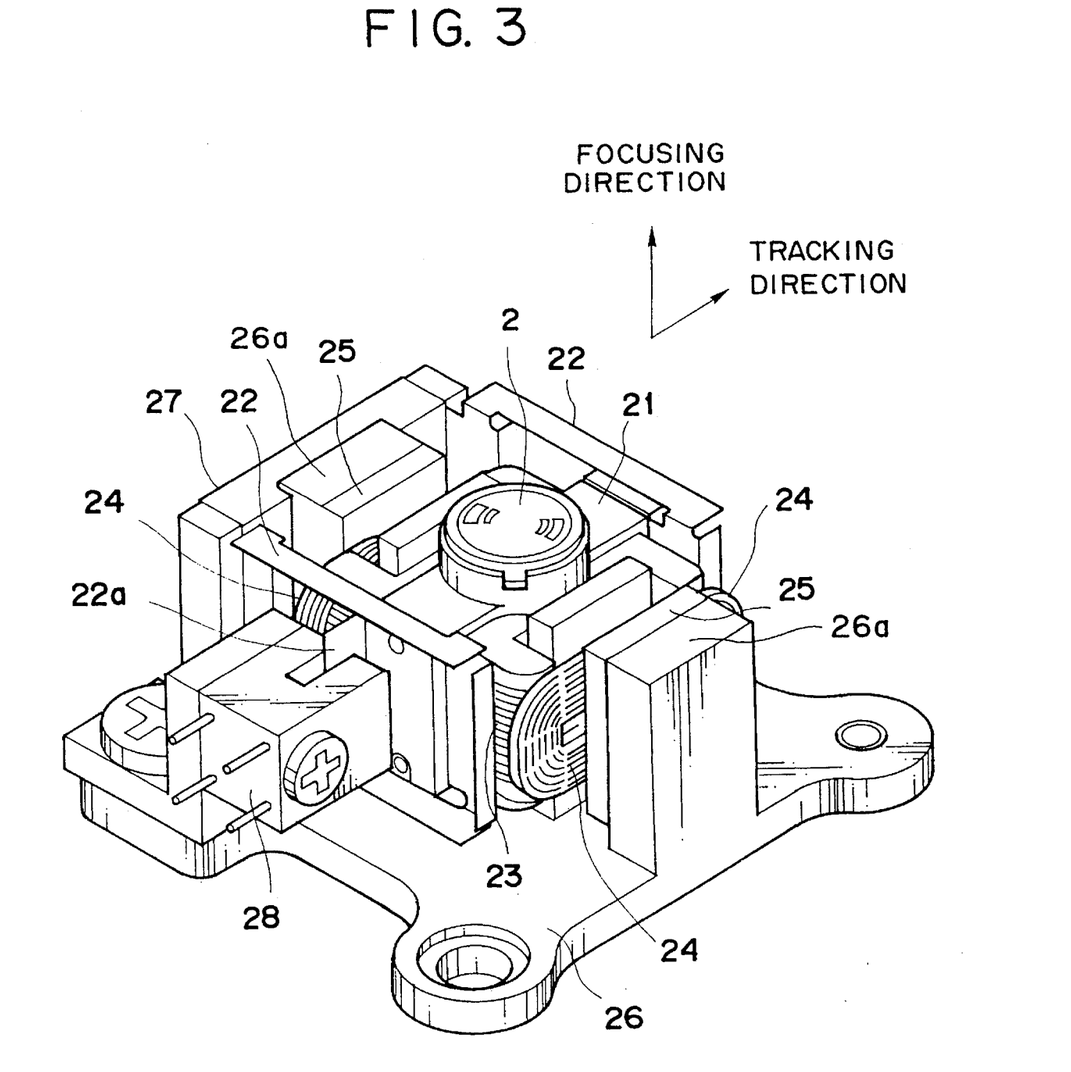
FIG. 3 is an enlarged perspective view of an optical pickup device in the apparatus shown in FIG. 2.

In the data reproduction mode, the above-mentioned limitation is canceled, and fine adjustment of the objective lens is performed within a range allowed by the actuator 3 and wider than that in the recording mode, thus improving near-seek performance. [Second Embodiment]

In the first embodiment, a movable range, in which the amplitude level of a reproduction signal becomes equal to or higher than a predetermined level, of the objective lens 2 is detected, and in the data recording mode, the tracking control of the objective lens 2 is limited to fall within the movable range. However, in the second embodiment, the central position of a movable range, in which the amplitude level of a reproduction signal becomes equal to or higher than a predetermined level, of the objective lens 2 is obtained, and a shift amount between the central position and an initial position of the objective lens 2 is detected. In the data recording mode, the tracking control of the objective lens 2 may be performed while being shifted by the detected shift amount.

The second embodiment will be described in detail below using the construction of the first embodiment described above.

In the second embodiment, a test signal is supplied from the control system to the encoder/decoder 46 to record the test signal prior to recording on the magnetooptical recording medium 1, and at the same time, a reproduction signal of the recorded test signal is detected by the servo/RF amplifier 40.

When the test signal is recorded, the system controller 44 performs recording while driving the objective lens 2 from one end to the other end of the movable range via the servo control circuit 43.

The servo control circuit 43 checks the amplitude level of the detected reproduction signal, and controls the arithmetic circuit 41 to calculate the central position of the movable range (a range capable of assuring an application magnetic field necessary for recording) in which information whose amplitude level exceeds a predetermined level is recorded, in the tracking direction, of the objective lens 2 in the recording mode, on the basis of the output from the position sensor 28, to further calculate a shift amount (offset amount) between the calculated central position and a reference position (neutral position or initial position) of the objective lens 2 with respect to the optical head 6, and to store the shift amount in the memory (storage means) 42.

Upon execution of data recording, the servo control circuit 43 executes tracking control of the objective lens 2 to shift the movable range by the offset amount stored in the memory 42. More specifically, the servo control circuit 43 adds or subtracts the offset amount to or from a servo signal obtained via the servo/RF amplifier 40, and executes the tracking control of the objective lens 2 using the servo signal obtained as a result of the calculation.

In place of shifting the tracking control range of the objective lens 2 by the offset amount, eccentric tracking (control for driving the optical head using the seek motor so that the objective lens 2 is located at the reference position of the optical head 6) of the optical head 6 with respect to tracks on the magnetooptical recording medium 1 may be performed while being shifted by the offset amount stored in the memory 42, thus obtaining the same effect as described above. Note that the shift operation is performed to compensate for the offset amount.

When magnetooptical recording is performed on a magnetooptical recording medium 1 compatible to the magnetooptical information recording/reproducing apparatus in this manner, data reproducibility in a reproduction mode can always be assured within the tracking fine adjustment range of the objective lens 2 even when the relative position between the magnetic head and the optical head is aligned with poor precision in assembling and/or when a position error occurs in use.

What is claimed is:

1. A magnetooptical information recording and/or reproducing apparatus for recording and/or reproducing information on and/or from a magnetooptical recording medium having a plurality of tracks, said apparatus comprising:

an objective lens for irradiating a track of the recording medium with a beam spot at a beam spot irradiated position;

detecting means for detecting a deviation of the beam spot from the track, and for generating a tracking error signal;

drive means for driving said objective lens in a direction perpendicular to the track;

tracking control means for controlling said drive means, on the basis of the tracking error signal, so that the beam spot and the track have a predetermined positional relationship therebetween;

magnetic field applying means for applying a magnetic field modulated according to information to the beam spot irradiated position of the recording medium;

reproducing means for reproducing information recorded on the recording medium; and displacement detecting means for detecting a displacement of said objective lens in the direction perpendicular to the track, wherein, prior to actual recording of information, overwritable test information is recorded on the recording medium by applying the magnetic field modulated according to the information by said magnetic field applying means while varying the beam spot irradiated position on the recording medium with respect to the track by said drive means, the recorded information is reproduced by said reproducing means, a movable range of said objective lens in the direction perpendicular to the track upon the recording of information, in which a level of a reproduction signal upon the reproduction of the information exceeds a predetermined level, is detected on the basis of a detection result of said displacement detecting means, and said tracking control means controls said drive means on the basis of the detected movable range in actual recording.

2. An apparatus according to claim 1, wherein said drive means comprises an objective lens holder for holding said objective lens, coils attached to said holder, and magnetic field applying means for applying a magnetic field orthogonal to said coils.

3. An apparatus according to claim 1, further comprising a carriage on which said objective lens, said drive means, said magnetic field applying means, and said displacement detecting means are mounted, said carriage being movable in a radial direction of the recording medium.

4. An apparatus according to claim 1, wherein said objective lens is moved only within the movable range.

5. A magnetooptical information recording and/or reproducing method for recording and/or reproducing information on and/or from a magnetooptical recording medium having a plurality of tracks, said method comprising the steps of:

irradiating a track of the recording medium with a beam spot at a beam spot irradiated position, by using an objective lens;

detecting a deviation of the beam spot from the track and generating a tracking error signal;

executing tracking control of the beam spot with respect to the track by driving the objective lens on the basis of the tracking error signal;

prior to actual recording of information, applying a magnetic field modulated according to test information to the beam spot irradiated position on the recording medium by magnetic field applying means while varying the beam spot irradiated position on the recording medium with respect to the track by moving the objective lens, and effecting recording of overwritable test information;

reproducing the test information recorded on the recording medium, and detecting a reproduction signal;

detecting a displacement of the objective lens in a direction perpendicular to the track; and detecting a movable range of the objective lens in a direction perpendicular to the track in said recording step, in which a level of the reproduction signal detected in said reproduction signal detecting step exceeds a predetermined level, on the basis of a detection result of said displacement detecting step, wherein the tracking control in said tracking control step is executed on the basis of the detected movable range.

6. A method according to claim 5, wherein the tracking control of the beam spot with respect to the track is performed only within the movable range.

7. A magnetooptical information recording and/or reproducing apparatus for recording and/or reproducing information on and/or from a magnetooptical recording medium having a plurality of tracks, said apparatus comprising:

an objective lens for irradiating a track of the recording medium with a beam spot at a beam spot irradiated position;

detecting means for detecting a deviation of the beam spot from the track and for generating a tracking error signal;

drive means for driving said objective lens in a direction perpendicular to the track;

tracking control means for controlling said drive means on the basis of the tracking error signal, so that the beam spot and the track have a predetermined positional relationship therebetween;

magnetic field applying means for applying a magnetic field modulated according to information to the beam spot irradiated position on the recording medium;

reproducing means for reproducing information recorded on the recording medium; and displacement detecting means for detecting a displacement of said objective lens in the direction perpendicular to the track, wherein, prior to actual recording of information, overwritable test information is recorded on the recording medium by applying to the recording medium a magnetic field modulated according to the test information by said magnetic field applying means while varying the beam spot irradiated position on the recording medium with respect to the track by said drive means, the recorded test information is reproduced by said reproducing means, a movable range of said objective lens in the direction perpendicular to the track upon recording of the information, in which a level of a reproduction signal obtained in the reproduction of the information exceeds a predetermined level, is detected on the basis of a detection result of said displacement detecting means, a difference between a center position of the detected movable range and an initial position of said objective lens is calculated, and said tracking control means controls said drive means on the basis of the calculated difference.

8. An apparatus according to claim 7, wherein said drive means comprises an objective lens holder for holding said objective lens, coils attached to said holder, and magnetic field applying means for applying a magnetic field orthogonal to said coils.

9. An apparatus according to claims 7, further comprising a carriage on which said objective lens, said drive means, said magnetic field applying means, and said displacement detecting means are mounted, said carriage being movable in a radial direction of the recording medium.

10. An apparatus according to claim 7, wherein said tracking control means performs the tracking control with a shift on the basis of the calculated difference.

11. A magnetooptical information recording and/or reproducing method for recording and/or reproducing information on and/or from a magnetooptical recording medium having a plurality of tracks, said method comprising the steps of:

irradiating a track of the recording medium with a beam spot at a beam spot irradiated position, by using an objective lens;

detecting a deviation of the beam spot from the track and generating a tracking error signal;

executing tracking control of the beam spot with respect to the track by driving the objective lens on the basis of the tracking error signal;

prior to actual reproducing of information, recording information by applying a magnetic field modulated according to test information to the beam spot irradiated position on the recording medium by magnetic field applying means while varying the beam spot irradiated position on the recording medium with respect to the track by moving the objective lens;

reproducing the test information recorded on the recording medium, and detecting a reproduction signal;

detecting a displacement of the objective lens in a direction perpendicular to the track;

detecting a movable range of the objective lens in a direction perpendicular to the track in said recording step, in which a level of the reproduction signal detected in said reproduction signal detecting step exceeds a predetermined level, on the basis of a detection result of said displacement detecting step; and obtaining a center position of the movable range detected in said movable range detection step and calculating a difference between the center position of the movable range and an initial position of the objective lens, wherein the tracking control of the beam spot in said tracking control step is performed in actual recording on the basis of the calculated difference.

12. A method according to claim 11, wherein said tracking control step further comprises executing the tracking control of the beam spot, so that the beam spot traces the track in a state wherein the beam spot is shifted by the calculated difference in the direction perpendicular to the track.

* * * * *

UNITED STATES PATENT AND TRADEMARK OFFICE
CERTIFICATE OF CORRECTION

PATENT NO. : 5,581,524
DATED : December 3, 1996
INVENTOR(S) : Masahisa FUJINO

It is certified that error appears in the above-indentified patent and that said Letters Patent is hereby corrected as shown below:

COLUMN 7:

Line 57, "information" should read --test information--; and
Line 60, "information" should read --test information--.

Signed and Sealed this

Thirteenth Day of May, 1997

Attest:

BRUCE LEHMAN

Attesting Officer

Commissioner of Patents and Trademarks